(12) United States Patent
Yao et al.

(10) Patent No.: US 10,740,657 B2
(45) Date of Patent: Aug. 11, 2020

(54) IMAGE PROCESSING METHOD AND IMAGE PROCESSING APPARATUS

(71) Applicant: HUAWEI TECHNOLOGIES CO., LTD., Shenzhen, Guangdong (CN)

(72) Inventors: Jun Yao, Beijing (CN); Tao Wang, Beijing (CN); Yu Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 15/964,045

(22) Filed: Apr. 26, 2018

(65) Prior Publication Data
US 2018/0247164 A1    Aug. 30, 2018

Related U.S. Application Data

(63) Continuation of application No. PCT/CN2016/080997, filed on May 4, 2016.

(30) Foreign Application Priority Data

Oct. 30, 2015    (CN) .......................... 2015 1 0728119

(51) Int. Cl.
*G06K 9/62*    (2006.01)
*G06T 1/60*    (2006.01)
(Continued)

(52) U.S. Cl.
CPC ....... *G06K 9/6281* (2013.01); *G06K 9/00986* (2013.01); *G06K 9/00993* (2013.01);
(Continued)

(58) Field of Classification Search
CPC ............. G06K 9/6281; G06K 9/00986; G06K 9/00993; G06K 9/4642; G06T 1/20; G06T 1/60
See application file for complete search history.

(56) References Cited

U.S. PATENT DOCUMENTS

| 8,301,872 | B2 | 10/2012 | Vorbach et al. |
| 2005/0050305 | A1 | 3/2005 | Kissell |

(Continued)

FOREIGN PATENT DOCUMENTS

| CN | 101369315 A | 2/2009 |
| CN | 102576299 A | 7/2012 |

(Continued)

OTHER PUBLICATIONS

Ross Girshick et al., Rich feature hierarchies for accurate object detection and semantic segmentation Tech report (v5). arXiv:1311.2524v5 [cs.CV] Oct. 22, 2014, 21 pages.

(Continued)

*Primary Examiner* — Leon Flores
(74) *Attorney, Agent, or Firm* — Huawei Technologies Co., Ltd.

(57) ABSTRACT

An image processing device and a method performed by the device are provided. The image processing device includes processors forming a partitioning unit, processors forming a partitioning unit, and memories shared by the partitioning unit and the classification unit. The partitioning unit obtains an image from a first memory, partitions the image into one or more areas, each area includes one or more objects to be classified, and saves information of the partitioning of the image in a second memory. The classification unit obtains the image from the first memory, obtains information of partitioning of the image from the second memory and classifies the objects in each area of the image to obtain a classification result of the image. The image processing device may further include a scheduling unit for controlling optimizing performance of the partitioning unit and the classification unit.

24 Claims, 8 Drawing Sheets

(51) Int. Cl.
*G06K 9/00* (2006.01)
*G06T 1/20* (2006.01)
*G06K 9/46* (2006.01)

(52) U.S. Cl.
CPC ............ *G06K 9/4642* (2013.01); *G06T 1/20* (2013.01); *G06T 1/60* (2013.01); *G06T 2207/20016* (2013.01)

(56) References Cited

U.S. PATENT DOCUMENTS

| | | |
|---|---|---|
| 2007/0157206 A1 | 7/2007 | Rakvic et al. |
| 2007/0300231 A1 | 12/2007 | Aguilar et al. |
| 2011/0060879 A1 | 3/2011 | Rogers et al. |
| 2012/0131366 A1 | 5/2012 | Rakvic et al. |
| 2012/0311301 A1 | 12/2012 | Vorbach et al. |
| 2013/0243329 A1 | 9/2013 | Oro Garcia et al. |
| 2014/0321378 A1 | 10/2014 | Zhang et al. |
| 2014/0333635 A1 | 11/2014 | Demouth et al. |
| 2014/0355879 A1* | 12/2014 | Agosta ............... G06K 9/00791 382/170 |
| 2014/0375662 A1 | 12/2014 | Chen et al. |
| 2015/0030219 A1 | 1/2015 | Madabhushi et al. |

FOREIGN PATENT DOCUMENTS

| | | |
|---|---|---|
| CN | 103166995 A | 6/2013 |
| CN | 203930824 U | 11/2014 |

OTHER PUBLICATIONS

"Kalin Ovtcharov et al., Accelerating Deep Convolutional Neural Networks Using Specialized Hardware. Microsoft Research, Feb. 22, 2015,4 pages".
Zidong Du et al., ShiDianNao: Shifting Vision Processing Closer to the Sensor. ISCA 15, Jun. 13-17, 2015, Portland, OR, USA, 13 pages.
PK Gupta, Xeon+FPGA Platform for the Data Center. ISCA/CARL 2015, 24 pages.
Kathryn Wilcox et al., A 28nm x86 APU Optimized for Power and Area Efficiency. ISSCC 2015, 2015 IEEE International Solid-State Circuits Conference, 3 pages.
Yung-Hsiang Lu et al., Rebooting Computing and Low-Power Image Recognition Challenge. Computer-Aided Design (ICCAD), 2015 IEEE/ACM International Conference on, Nov. 2-6, 2015, 6 pages.
Tianshi Chen et al., DianNao: A Small-Footprint High-Throughput Accelerator for Ubiquitous Machine-Learning. ASPLOS '14, Mar. 1-5, 2014, Salt Lake City, Utah, USA, 15 pages.

* cited by examiner

IMAGE PROCESSING METHOD AND IMAGE PROCESSING APPARATUS

CROSS-REFERENCE TO RELATED APPLICATIONS

This application is a continuation of International Application No. PCT/CN2016/080997, filed on May 4, 2016, which claims priority to Chinese Patent Application No. 201510728119.5, filed on Oct. 30, 2015. The disclosures of the aforementioned applications are hereby incorporated by reference in their entireties.

STATEMENT OF JOINT RESEARCH AGREEMENT

The subject matter and the claimed invention were made by or on the behalf of Tsinghua University, of Haidian District, Beijing, P.R. China and Huawei Technologies Co., Ltd., of Shenzhen, Guangdong Province, P.R. China, under a joint research agreement titled "Image Processing Method and Image Processing Apparatus". The joint research agreement was in effect on or before the claimed invention was made, and that the claimed invention was made as a result of activities undertaken within the scope of the joint research agreement.

TECHNICAL FIELD

The present application relates to the image processing field, and in particular, to an image processing method and an image processing apparatus.

BACKGROUND

In the image processing field, a target in an image is generally detected and recognized in two stages of operations: partitioning and classification. As shown in FIG. 1, an image partitioning model receives an input image, and divides the input image into areas of different sizes. An image classification model continuously extracts features of each area of the image through a hierarchical structure using a convolutional neural network or other classification algorithms, to finally recognize a target object in the area.

In detecting and recognizing a target in an image, the partitioning operation and the classification operation have different performance requirements for processors. Currently, a heterogeneous platform is used for image recognition. For example, a "central processing unit (CPU)+graphics processing unit (GPU)" heterogeneous platform is used. A GPU is an easily programmable high-performance processor. Different from a CPU that is mainly used for data computation and instruction interpretation, a GPU is specifically designed for complex mathematical and geometrical computations, and is mainly used for graph and image processing. To fully use the computation performance of the CPU and the image processing performance of the GPU, a CPU+GPU heterogeneous platform is used for performing image recognition. The CPU is used first for image partitioning, and then the GPU is used for image classification.

However, in the heterogeneous platform, memories of processors of different types are independent of each other. For example, in the CPU+GPU heterogeneous platform, the CPU has an independent CPU memory, and the GPU also has an independent GPU memory (which is also referred to as a video RAM). Therefore, when the heterogeneous platform is used for target detection and recognition, data needs to be constantly exchanged between the heterogeneous processors (such as, between the CPU and the GPU). A large quantity of data exchange operations may cause a relatively long delay. Consequently, detection performance of the entire heterogeneous platform is affected.

SUMMARY

Embodiments of the present application provide an image processing method, to improve image processing performance. Further, embodiments of the present application provide an image processing apparatus that performs the method.

A first aspect of the present application provides an image processing method, which is applicable to an image processing apparatus. Processing units of the image processing apparatus include a partitioning processing unit and a classification processing unit, and memories include a first memory and a second memory. The partitioning processing unit may be a CPU, a DSP, a processor core, or another hardware circuit that can implement an image partitioning operation. The classification processing unit may be a GPU, an FPGA, or a hardware circuit that can implement an image classification operation. The partitioning processing unit and the classification processing unit are heterogeneous processing units, and share the first memory and the second memory. The first memory stores a first to-be-processed image. The partitioning processing unit obtains the first image from the first memory, partitions the first image to obtain a first partitioning result, and then saves the first partitioning result in the second memory. The classification processing unit obtains the first partitioning result saved by the partitioning processing unit from the second memory, and obtains the first image from the first memory. Then the classification processing unit classifies the first image according to the first image and the first partitioning result to obtain a first classification result. Different from a case in a technology at a current stage that memories of heterogeneous processing units are independent of each other, the first memory and the second memory are shared by the partitioning processing unit and the classification processing unit in the present application. Therefore, shared data such as the first image and the first partitioning result does not need to be transported between the partitioning processing unit and the classification processing unit. In this way, a delay caused by data transportation between the processing units is avoided, and an image processing speed is increased, and image processing performance is improved.

Optionally, the processing units of the image processing apparatus may further include a scheduling processing unit, which is configured to obtain the first to-be-processed image from outside of the image processing apparatus, and save the obtained first image in the first memory. Because the scheduling processing unit needs to access the first memory, the scheduling processing unit, the partitioning processing unit, and the classification processing unit share the first memory.

Optionally, each processing unit does not process multiple images in batches, but processes multiple images in series in a pipelining manner. Specifically, after saving the obtained first image in the first memory, the scheduling processing unit performs the following operations: obtaining a second to-be-processed image, and saving the second image in the first memory. After obtaining the first partitioning result, the partitioning processing unit performs the following steps: obtaining the second image from the first memory, partitioning the second image to obtain a second partitioning result, and saving the second partitioning result in the second memory. After obtaining the first classification result, the classification processing unit performs the following steps: obtaining the second image from the first memory, obtaining the second partitioning result from the second memory, and then classifying the second image according to the second image and the second partitioning result to obtain a second classification result. When the pipelining manner is used, a memory capacity requirement of each processing unit can be reduced, and each processing unit can be fully used.

Optionally, the scheduling processing unit may control start, working, and suspension of each processing unit. Specifically, the scheduling processing unit may control a moment at which the scheduling processing unit starts the operation of obtaining the second to-be-processed image to be not earlier than a moment at which the partitioning processing unit starts the operation of partitioning the first image, so as to reduce average power of the scheduling processing unit. Similarly, the scheduling processing unit may further control a moment at which the partitioning processing unit starts the operation of partitioning the second image to be not earlier than a moment at which the classification processing unit starts the operation of classifying the first image, so as to reduce average power of the partitioning processing unit.

Optionally, the scheduling processing unit may suspend the partitioning processing unit when usage of the second memory reaches first preset usage or the second memory is full, so as to avoid overstock of a partitioning results in the second memory, where the partitioning result is obtained by computing by the partitioning processing unit.

Optionally, the image processing apparatus may further include a third memory, which is configured to store a classification result obtained by computing by the classification processing unit. After obtaining the first classification result, the classification processing unit saves the first classification result in the third memory. The scheduling processing unit is responsible for reading the first classification result from the third memory, and outputting the first classification result to the outside of the image processing apparatus, such as writing the first classification result to a disk. The third memory is shared at least by the scheduling processing unit and the classification processing unit.

Optionally, the scheduling processing unit may suspend the classification processing unit when usage of the third memory reaches second preset usage or the third memory is full, so as to avoid overstock of the classification results in the third memory, where the classification result is obtained by computing by the classification processing unit.

Optionally, the scheduling processing unit may further be responsible for adjusting a size or bandwidth of a memory in the image processing apparatus. Specifically, the scheduling processing unit may obtain first duration in which the partitioning processing unit performs the operation of partitioning the first image and second duration in which the classification processing unit performs the operation of classifying the first image. If the first duration is greater than the second duration, it indicates that a rate at which the classification processing unit performs the classification operation is higher than a rate at which the partitioning processing unit performs the partitioning operation, and the scheduling processing unit may increase a size of the second memory, and/or increase bandwidth of the second memory, and/or reduce a size of the third memory, and/or reduce bandwidth of the third memory. Alternatively, if the first duration is less than the second duration, it indicates that a rate at which the partitioning processing unit performs the partitioning operation is higher than a rate at which the classification processing unit performs image classification, and the scheduling processing unit may reduce a size of the second memory, and/or reduce bandwidth of the second memory, and/or increase a size of the third memory, and/or increase bandwidth of the third memory.

Optionally, the image processing apparatus may further include a fourth memory and/or a fifth memory, where the fourth memory is configured to store an intermediate result generated when the partitioning processing unit performs the partitioning operation, and the fifth memory is configured to store an intermediate result generated when the classification processing unit performs the classification operation. When the first duration is greater than the second duration, the scheduling processing unit may further increase a size of the fourth memory, and/or reduce a size of the fifth memory, and/or increase bandwidth of the fourth memory, and/or reduce bandwidth of the fifth memory. Alternatively, when the first duration is less than the second duration, the scheduling processing unit may reduce a size of the fourth memory, and/or increase a size of the fifth memory, and/or reduce bandwidth of the fourth memory, and/or increase bandwidth of the fifth memory.

Optionally, the scheduling processing unit may suspend the partitioning processing unit when usage of the fourth memory reaches third preset usage or the fourth memory is full; and/or the scheduling processing unit may suspend the classification processing unit when usage of the fifth memory reaches fourth preset usage or the fifth memory is full.

Optionally, the image processing apparatus may further include a sixth memory, which is configured to store an algorithm parameter used by the partitioning processing unit to perform the partitioning operation and an algorithm parameter used by the classification processing unit to perform the classification operation. The sixth memory is shared at least by the partitioning processing unit and the classification processing unit.

A second aspect of the present application provides an image processing apparatus. Processing units of the image processing apparatus include a partitioning processing unit and a classification processing unit, and memories include a first memory and a second memory. The partitioning processing unit may be a CPU, a DSP, a processor core, or another hardware circuit that can implement an image partitioning operation. The classification processing unit may be a GPU, an FPGA, or a hardware circuit that can implement an image classification operation. The partitioning processing unit and the classification processing unit are heterogeneous processing units, and share the first memory and the second memory. The partitioning processing unit is configured to: obtain a first to-be-processed image from the first memory, partition the first image to obtain a first partitioning result, and save the first partitioning result in the second memory. The classification processing unit is configured to: obtain the first partitioning result saved by the partitioning processing unit from the second memory, and obtain the first image from the first memory. Then the classification processing unit classifies the first image according to the first image and the first partitioning result to obtain a first classification result. Because the first memory and the second memory are shared by the partitioning processing unit and the classification processing unit, shared data such as the first image and the first partitioning result does not need to be transported between the partitioning processing unit and the classification processing unit. In this way, a delay caused by data transportation between the processing units is avoided, and an image processing speed is increased, and image processing performance is improved.

Optionally, the processing units of the image processing apparatus may further include a scheduling processing unit, which is configured to obtain the first to-be-processed image from outside of the image processing apparatus, and save the obtained first image in the first memory. Because the scheduling processing unit needs to access the first memory, the scheduling processing unit, the partitioning processing unit, and the classification processing unit share the first memory.

Optionally, each processing unit does not process multiple images in batches, but processes multiple images in series in a pipelining manner. Specifically, after saving the obtained first image in the first memory, the scheduling processing unit is further configured to start to perform the following steps: obtaining a second to-be-processed image, and saving the obtained second image in the first memory. After obtaining the first partitioning result, the partitioning processing unit is further configured to start to perform the following steps: obtaining the second image from the first memory, partitioning the second image to obtain a second partitioning result, and saving the second partitioning result in the second memory. After obtaining the first classification result, the classification processing unit is further configured to start to perform the following steps: obtaining the second image from the first memory, obtaining the second partitioning result from the second memory, and then classifying the second image according to the second image and the second partitioning result to obtain a second classification result. When the pipelining manner is used, a start moment of each processing unit may be controlled by the scheduling processing unit.

Optionally, the scheduling processing unit is further configured to control start, working, and suspension of each processing unit. Specifically, the scheduling processing unit is configured to control a moment at which the scheduling processing unit starts the operation of obtaining the second to-be-processed image to be not earlier than a moment at which the partitioning processing unit starts the operation of partitioning the first image, so as to reduce average power of the scheduling processing unit; and/or the scheduling processing unit may further be configured to control a moment at which the partitioning processing unit starts the operation of partitioning the second image to be not earlier than a moment at which the classification processing unit starts the operation of classifying the first image, so as to reduce average power of the partitioning processing unit.

Optionally, the scheduling processing unit is further configured to suspend the partitioning processing unit when usage of the second memory reaches first preset usage or the second memory is full, so as to avoid overstock of a partitioning results in the second memory, where the partitioning result is obtained by computing by the partitioning processing unit.

Optionally, the image processing apparatus may further include a third memory, which is configured to store a classification result that is obtained by computing by the classification processing unit. After obtaining the first classification result, the classification processing unit is further configured to save the first classification result in the third memory. The scheduling processing unit is further configured to: read the first classification result from the third memory, and output the first classification result to the outside of the image processing apparatus, such as writing the first classification result to a disk. The third memory is shared at least by the scheduling processing unit and the classification processing unit.

Optionally, the scheduling processing unit is further configured to suspend the classification processing unit when usage of the third memory reaches second preset usage or the third memory is full, so as to avoid overstock of the classification results in the third memory, where the classification result is obtained by computing by the classification processing unit.

Optionally, the scheduling processing unit is further configured to adjust a size or bandwidth of a memory in the image processing apparatus. Specifically, the scheduling processing unit is further configured to obtain first duration in which the partitioning processing unit performs the operation of partitioning the first image and second duration in which the classification processing unit performs the operation of classifying the first image. If the first duration is greater than the second duration, it indicates that a rate at which the classification processing unit performs the classification operation is higher than a rate at which the partitioning processing unit performs the partitioning operation, and the scheduling processing unit increases a size of the second memory, and/or increases bandwidth of the second memory, and/or reduces a size of the third memory, and/or reduces bandwidth of the third memory. Alternatively, if the first duration is less than the second duration, it indicates that a rate at which the partitioning processing unit performs the partitioning operation is higher than a rate at which the classification processing unit performs image classification, and the scheduling processing unit reduces a size of the second memory, and/or reduces bandwidth of the second memory, and/or increases a size of the third memory, and/or increases bandwidth of the third memory.

Optionally, the image processing apparatus may further include a fourth memory and/or a fifth memory, where the fourth memory is configured to store an intermediate result generated when the partitioning processing unit performs the partitioning operation, and the fifth memory is configured to store an intermediate result generated when the classification processing unit performs the classification operation. When the first duration is greater than the second duration, the scheduling processing unit is further configured to increase a size of the fourth memory, and/or reduce a size of the fifth memory, and/or increase bandwidth of the fourth memory, and/or reduce bandwidth of the fifth memory. Alternatively, when the first duration is less than the second duration, the scheduling processing unit is further configured to reduce a size of the fourth memory, and/or increase a size of the fifth memory, and/or reduce bandwidth of the fourth memory, and/or increase bandwidth of the fifth memory.

Optionally, the scheduling processing unit is further configured to suspend the partitioning processing unit when usage of the fourth memory reaches third preset usage or the fourth memory is full; and/or the scheduling processing unit is further configured to suspend the classification processing unit when usage of the fifth memory reaches fourth preset usage or the fifth memory is full.

Optionally, the image processing apparatus may further include a sixth memory, which is configured to store an algorithm parameter used by the partitioning processing unit to perform the partitioning operation and an algorithm parameter used by the classification processing unit to perform the classification operation. The sixth memory is shared at least by the partitioning processing unit and the classification processing unit.

DESCRIPTION OF EMBODIMENTS

Embodiments of the present application provide an image processing method, to improve image processing performance. The embodiments of the present application further provide a related image processing apparatus. The image processing method and the image processing apparatus are separately described in the following.

Figure 1:
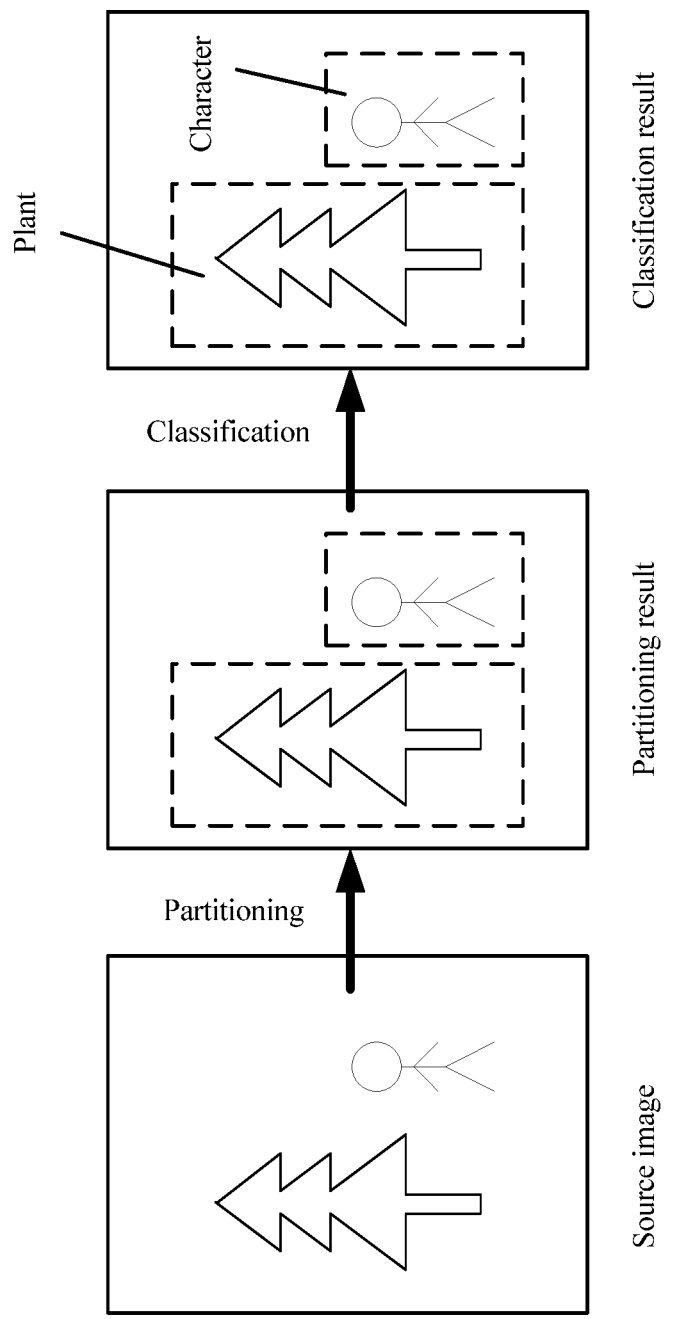
FIG. 1 is a schematic flowchart of image target detection.

In the image processing field, a target in an image is generally detected and recognized in two stages of operations: partitioning and classification. As shown in FIG. 1, an image partitioning model receives an input image, and divides the input image into areas of different sizes in the partitioning operation. An image classification model performs the classification operation using a convolutional neural network or other classification algorithms, to finally recognize a target object in an area of the image. In a technology at a current stage, a heterogeneous platform is generally used for image recognition.

A central processing unit (CPU) is a computation and control core of a system. Main functions of the CPU are interpreting system instructions and processing data in system software. A graphics processing unit (GPU) is an easily programmable high-performance processor. It can perform complex mathematical and geometrical computations. The GPU is generally used for graph and image processing of a system. To fully use the respective advantages of the CPU and the GPU, a CPU+GPU heterogeneous platform is used for detecting and recognizing a target in an image. The heterogeneous platform is a platform on which two or more types of processors are integrated. For ease of description, in the following, a CPU+GPU heterogeneous platform for image recognition is described as an example.

Figure 2:
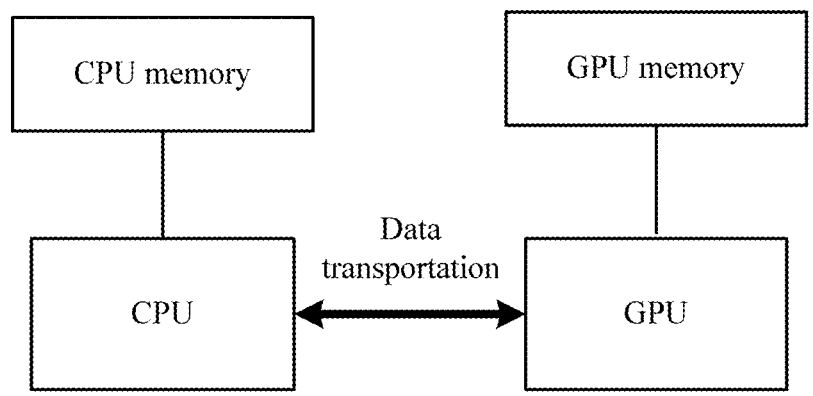
FIG. 2 is a block diagram of a CPU+GPU heterogeneous platform in a technology at a current stage.

FIG. 2 shows a basic structure of a CPU+GPU heterogeneous platform in the technology at the current stage. In a target detection and recognition process, the CPU first partitions a source image, and writes a partitioning result to a CPU memory. Because different types of processors on the heterogeneous platform do not share a memory, the CPU needs to transport the partitioning result to a GPU memory. Then, the GPU classifies the source image with reference to the source image and the partitioning result to obtain a classification result (that is, a detection and recognition result of the target in the image). In an image processing process, the CPU obtains partitioning results by means of continuous computations, and writes the partitioning results to the CPU memory. Therefore, the CPU needs to continuously transport data in the CPU memory to the GPU memory. A large amount of data transportation between the CPU memory and the GPU memory causes a relatively long delay and reduces the speed of image processing. Consequently, target detection performance of the entire platform is affected.

To resolve a problem of inferior target detection performance of the CPU+GPU heterogeneous platform, embodiments of the present application provide an image processing apparatus, and a corresponding image processing method based on the image processing apparatus. The following describes, with reference to FIG. 3, a basic structure of the image processing apparatus provided in the embodiments of the present application. The image processing apparatus includes a partitioning processing unit 301, a classification processing unit 302, a first memory 303, and a second memory 304.

The partitioning processing unit 301 is mainly configured to perform image partitioning operations. One or more processors may serve as the partitioning processing unit 301. A processor for the partitioning processing unit may be a CPU, a digital signal processor (DSP), or a processor of another type. Alternatively, one or more cores in a processor, or another hardware circuit that is capable of performing the image partitioning operation, may serve as the partitioning processing unit 301, which is not limited in embodiments of the present application.

The classification processing unit 302 is mainly configured to perform image classification operations. One or more processors may serve as the classification processing unit. A processor for the classification processing unit may be a GPU, a field-programmable gate array (FPGA), or a processor of another type. Alternatively, one or more cores in a processor, or another hardware circuit that is capable of performing the image classification operation, may serve as the classification processing unit 302, which is not limited in embodiments of the present application.

The partitioning processing unit 301 and the classification processing unit 302 are heterogeneous processing units. This means that the partitioning processing unit 301 and the classification processing unit 302 are processing units of different types. For example, if the partitioning processing unit 301 is a CPU, the classification processing unit 302 cannot be a CPU, but may be a GPU, an FPGA, or a processing unit of another type.

The first memory 303 is configured to store a to-be-processed source image. The first memory 303 is connected to both the partitioning processing unit 301 and the classification processing unit 302, and is shared by the partitioning processing unit 301 and the classification processing unit 302. Both the partitioning processing unit 301 and the classification processing unit 302 can directly access data in the first memory 303.

The second memory 304 is configured to store a result of the image partitioning operation performed by the partitioning processing unit 301. The second memory 304 is connected to both the partitioning processing unit 301 and the classification processing unit 302, and is shared by the partitioning processing unit 301 and the classification processing unit 302. Both the partitioning processing unit 301 and the classification processing unit 302 can directly access data in the second memory 304.

Figure 3:
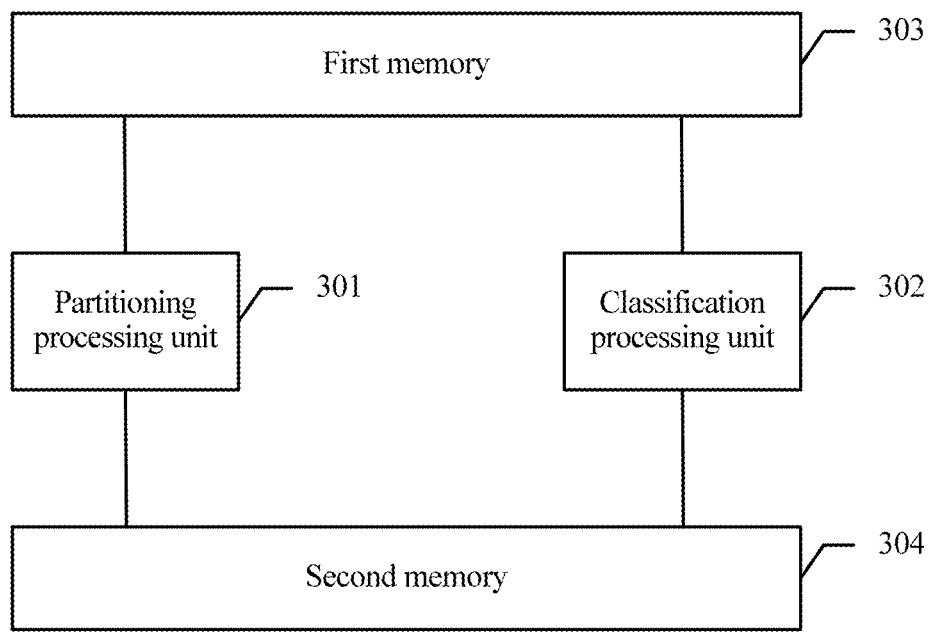
FIG. 3 is a block diagram of an image processing apparatus according to an embodiment of the present application.
Figure 4:
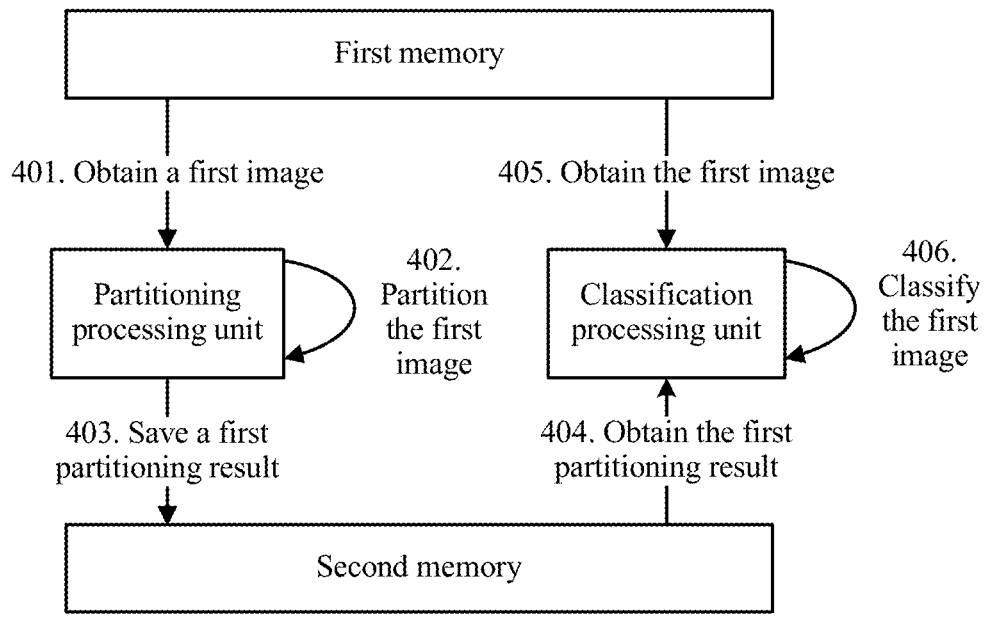
FIG. 4 is a schematic flowchart of an image processing method according to an embodiment of the present application.

Based on the image processing apparatus shown in FIG. 3, an embodiment of the present application provides a corresponding image processing method. Referring to FIG. 4, the following explains a basic procedure of the method by using a first image as an example.

401. A first memory stores a to-be-processed first image, and a partitioning processing unit obtains the first image from the first memory.

402. The partitioning processing unit partitions the first image to obtain a first partitioning result.

403. The partitioning processing unit saves the first partitioning result in a second memory.

404. A classification processing unit obtains the first partitioning result from the second memory. Optionally, after the classification processing unit obtains the first partitioning result, the first partitioning result may be deleted from the second memory.

405. The classification processing unit obtains the first image from the first memory. Optionally, after the classification processing unit obtains the first image from the first memory, the first image may be deleted from the first memory.

There is no specific order between step 405 and steps 401 to 404, and step 405 may also be before any one of steps 401 to 404.

406. The classification processing unit classifies the first image according to the first image and the first partitioning result to obtain a first classification result.

It may be learned from the procedure shown in FIG. 4 that the first image needs to be shared between the partitioning processing unit and the classification processing unit, and the first partitioning result obtained by computing by the partitioning processing unit needs to be used by the classification processing unit. Different from a case in a technology at a current stage that memories of heterogeneous processing units are independent of each other, in this embodiment of the present application, the first image is stored in the first memory, and the first memory is shared between the partitioning processing unit and the classification processing unit. Therefore, the partitioning processing unit does not need to transport the first image from a memory of the partitioning processing unit to a memory of the classification processing unit. Similarly, the first partitioning result is stored in the second memory, and the second memory is also shared between the partitioning processing unit and the classification processing unit. Therefore, the partitioning processing unit does not need to transport the first partitioning result from the memory of the partitioning processing unit to the memory of the classification processing unit. In conclusion, according to the method provided in this embodiment, shared data is stored in shared memories, so that data transportation operations between different processing units are reduced in an image processing process. Therefore, delays caused by data transportation between the processing units are reduced, image processing speed is increased, and image processing performance is improved.

As mentioned above with regard to step 401, the first memory stores the first to-be-processed image. The first image may be obtained by the partitioning processing unit and saved in the first memory. Optionally, a scheduling processing unit is further provided in embodiments of the present application. The scheduling processing unit is configured to obtain the to-be-processed first image before step 401, and save the obtained first image in the first memory. The scheduling processing unit, the partitioning processing unit, and the classification processing unit share the first memory.

The scheduling processing unit is used to obtain the first image from outside of the image processing apparatus and save the first image in the first memory. After step 406, the image processing apparatus needs to output the first classification result from the image processing apparatus (such as writing the first classification result to a disk). This operation may also be performed by the scheduling processing unit. Specifically, a third memory may further be added. After step 406, the classification processing unit saves the first classification result in the third memory. The scheduling processing unit outputs the first classification result in the third memory from the image processing apparatus.

Figure 5:
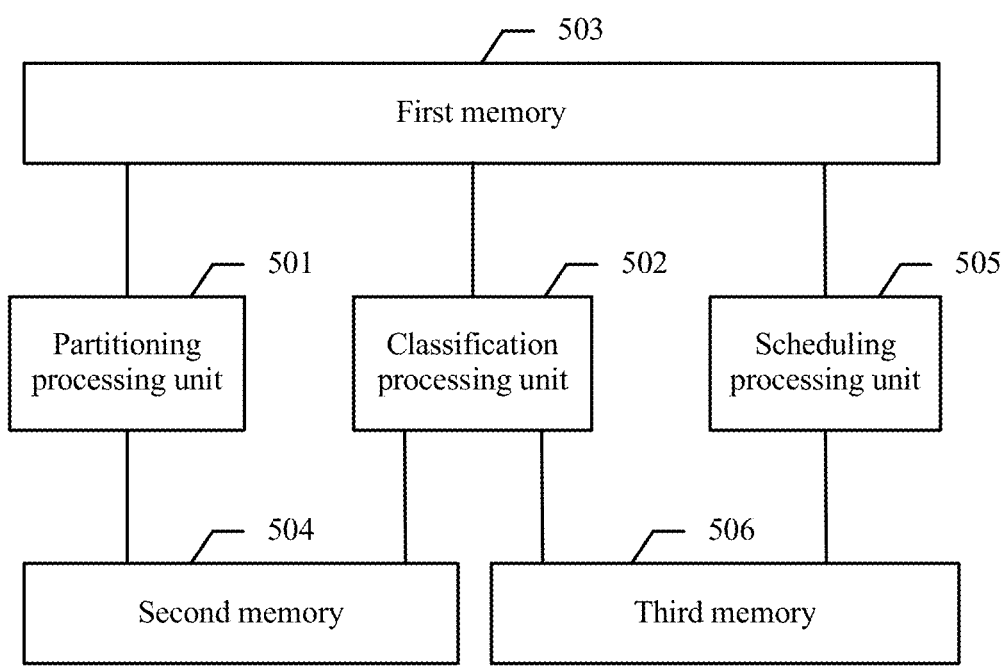
FIG. 5 is a block diagram of another image processing apparatus according to an embodiment of the present application.

With reference to descriptions in the foregoing two paragraphs, an image processing apparatus is provided in another embodiment of the present application. Referring to FIG. 5, a partitioning processing unit 501, a classification processing unit 502, a first memory 503, and a second memory 504 are basically the same as the partitioning processing unit 301, the classification processing unit 302, the first memory 303, and the second memory 304 that are shown in FIG. 3, and details are not described herein. Both a scheduling processing unit 505 and a third memory 506 are optional modules. For operations specifically performed by the scheduling processing unit 505 and the third memory 506 or functions specifically performed by the scheduling processing unit 505 and the third memory 506, reference may be made to the descriptions in the foregoing two paragraphs, and details are not described herein.

An image processing apparatus generally processes multiple images in batches. For example, a scheduling processing unit obtains 50 images in batches. After the 50 images are obtained, a partitioning processing unit partitions the 50 images in batches, and writes results to a memory of the partitioning processing unit. After the 50 images are partitioned, a classification processing unit classifies the 50 images. Such a manner of batch processing requires that each processing unit to have a relatively large memory capacity. When one processing unit works, another processing unit may be in an idle state (for example, in a process in which the partitioning processing unit performs partitioning on the 50 images in batches, the classification processing unit is in an idle state all the time). Alternatively, in an embodiment of the present application, the image processing apparatus may process images in a pipelining manner, so as to lower memory capacity requirement and make full use of each processing unit. The following describes the pipelining manner by using a first image and a second image as an example.

Figure 6:
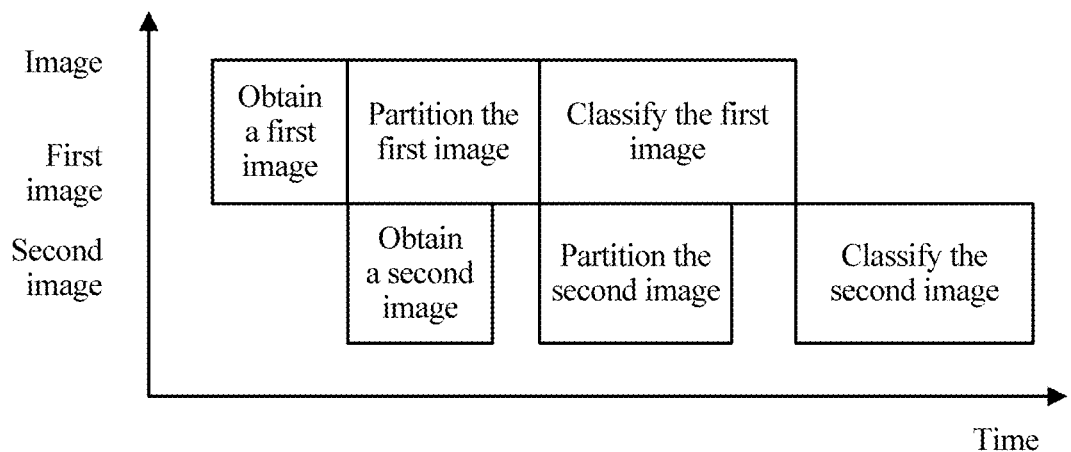
FIG. 6 is another schematic flowchart of an image processing method according to an embodiment of the present application.

Referring now to FIG. 6, the horizontal-axis represents time, and the vertical-axis represents processed images. After obtaining a first image and saving the first image in a first memory, a task scheduling processing unit starts an operation of obtaining a second image and saving the second image in the first memory. The scheduling processing unit may start, immediately after completing the operation of obtaining the first image, the operation of obtaining the second image, or may start, at a moment after completing the operation of obtaining the first image, the operation of obtaining the second image, which is not limited herein. Similarly, after a partitioning processing unit partitions the first image to obtain a first partitioning result, and saves the first partitioning result in a second memory, the scheduling processing unit may control start of the following operations, or the partitioning processing unit may spontaneously start the following operations: partitioning the second image to obtain a second partitioning result, and saving the second partitioning result in the second memory. After a classification processing unit classifies the first image according to the first image and the first partitioning result to obtain a first classification result, the scheduling processing unit may control start of the following operations, or the partitioning processing unit may spontaneously start the following operations: obtaining the second image from the first memory, obtaining the second partitioning result from the second memory, and classifying the second image according to the second image and the second partitioning result to obtain a second classification result. If an image processing apparatus includes the scheduling processing unit and a third memory, the classification processing unit further saves the second classification result in the third memory, and the scheduling processing unit outputs the second classification result from the third memory.

It should be noted that, in this embodiment of the present application, the scheduling processing unit is a functional processing unit. In an actual product, the scheduling processing unit may be an independent processing unit, or may be a same processing unit as the partitioning processing unit or the classification processing unit. This means that, the actual product may not include an entity scheduling processing unit, and in this embodiment of the present application, operations performed by the scheduling processing unit may be performed by the partitioning processing unit and/or the classification processing unit. For example, the image processing apparatus provided in this embodiment of the present application may be created by using one DSP, a single-core CPU, and a dual-core GPU. The CPU plays a role of the scheduling processing unit, the DSP plays a role of the partitioning processing unit, and the dual-core GPU plays a role of the classification processing unit. For another example, the image processing apparatus provided in this embodiment of the present application may be created by using a quad-core CPU and a dual-core GPU. The dual-core GPU plays a role of the classification processing unit. First three cores of the quad-core CPU play a role of the partitioning processing unit, and the fourth core plays a role of the partitioning processing unit, and, simultaneously, performs an operation that needs to be performed by the scheduling processing unit.

As mentioned in the foregoing paragraph, the scheduling processing unit is a functional processing unit. Optionally, in the present application, more scheduling tasks are further introduced for the scheduling processing unit. The scheduling tasks may include memory adjustment task and procedure control task.

1. Memory Adjustment Task

The scheduling processing unit may adjust a size or a bandwidth of a memory in the image processing apparatus according to a running state of the image processing apparatus.

For example, generally for processing an image, an amount of computation in partitioning is less than an amount of computation in classification. Therefore, an image partitioning operation is generally faster than an image classification operation. If the partitioning processing unit performs partitioning operations fast, and the classification processing unit cannot process partitioning results in timely manner, the partitioning results would be overstocked in the second memory. Consequently, fast computation performance of the partitioning processing unit is wasted. If, for an image, duration in which the partitioning processing unit performs partitioning is equal to duration in which the classification processing unit performs classification, or in other words an image processing rate of the partitioning processing unit is the same as an image processing rate of the classification processing unit, the classification processing unit can process a partitioning result of the partitioning processing unit in time. Overstock of the partitioning results is not caused, and performance reduction of the partitioning processing unit or the classification processing unit is not caused.

In order to achieve the synchronous processing between the partitioning processing unit and the classification processing unit, the scheduling processing unit may obtain a first duration in which the partitioning processing unit performs an operation of partitioning the first image and a second duration in which the classification processing unit performs an operation of classifying the first image. If the first duration is greater than the second duration, the scheduling processing unit may increase a size of the second memory. In this way, more partitioning results can be saved in the second memory, and the classification processing unit does not need to spend a relatively long time waiting for the partitioning result of the partitioning processing unit. In addition, because a total memory of the image processing apparatus is fixed, increasing the size of the second memory may reduce a size of the third memory. Therefore, when there is no space in the third memory for storing a classification result of the classification processing unit, the classification processing unit has to be suspended. In this way, an objective of limiting the image classification rate of the classification processing unit is achieved. Alternatively, the scheduling processing unit may also directly reduce a size of the third memory to limit the image classification rate of the classification processing unit. The scheduling processing unit may further increase bandwidth of the second memory, so that the partitioning result of the partitioning processing unit can be quickly transported to the second memory, which is beneficial to an increase of the image partitioning rate of the partitioning processing unit. In addition, because total bandwidth of the image processing apparatus is fixed, increasing the bandwidth of the second memory may reduce bandwidth of the third memory. Therefore, a rate at which the classification processing unit saves the classification result in the third memory is reduced, and the image classification rate of the classification processing unit is limited. Alternatively, the scheduling processing unit may also directly reduce bandwidth of the third memory to limit the image classification rate of the classification processing unit.

Based on a similar reason, if the first duration is less than the second duration, the scheduling processing unit may reduce a size of the second memory, and/or reduce bandwidth of the second memory, and/or increase a size of the third memory, and/or increase bandwidth of the third memory, to limit the rate at which the partitioning processing unit performs the partitioning operation.

Figure 7:
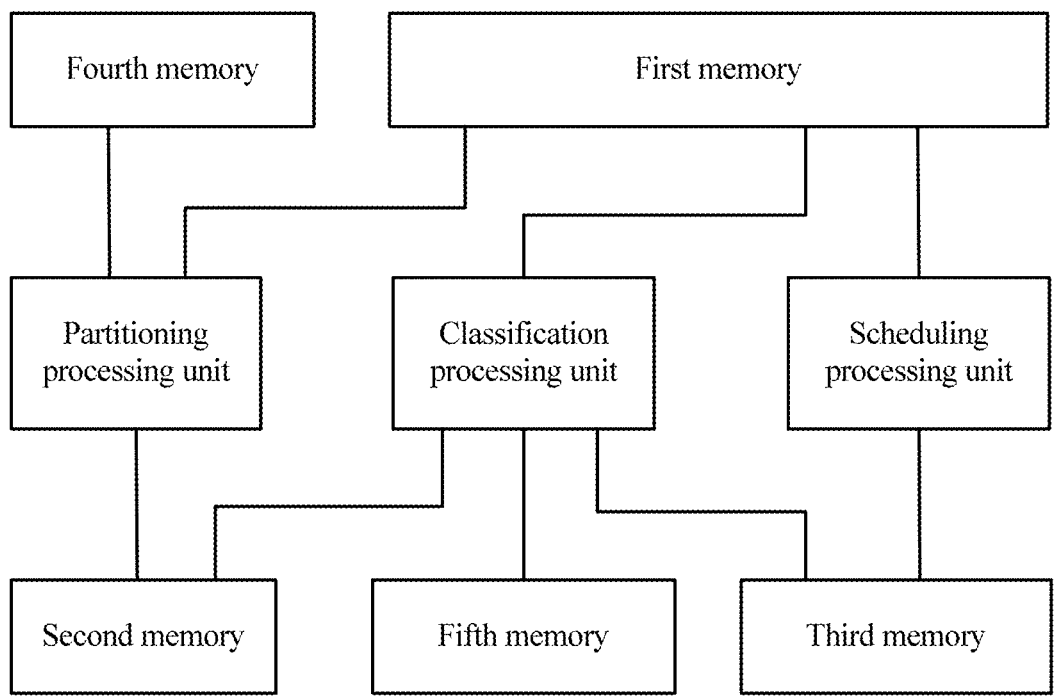
FIG. 7 is a block diagram of yet another image processing apparatus according to an embodiment of the present application.

For another example, as shown in FIG. 7, the image processing apparatus may further include a fourth memory that is configured to store an intermediate result generated when the partitioning processing unit performs the partitioning operation, and/or a fifth memory that is configured to store an intermediate result generated when the classification processing unit performs the classification operation. If the first duration is greater than the second duration, namely a rate of the partitioning processing unit is lower than a rate of the classification processing unit, the scheduling processing unit may reduce a rate at which the classification processing unit performs the classification operation by increasing a size of the fourth memory, and/or increasing bandwidth of the fourth memory, and/or reducing a size of the fifth memory, and/or reducing bandwidth of the fifth memory. Similarly, optionally, if the first duration is less than the second duration, the scheduling processing unit may reduce a size of the fourth memory, and/or reduce bandwidth of the fourth memory, and/or increase a size of the fifth memory, and/or increase bandwidth of the fifth memory.

2. Procedure Control Task

Starting, working, and suspension of both the partitioning processing unit and the classification processing unit may be controlled by the scheduling processing unit.

For example, if usage of the second memory reaches a first preset usage, it indicates that the partitioning results of the partitioning processing unit are overstocked in the second memory, the scheduling processing unit may suspend the partitioning processing unit. The scheduling processing unit may further restart the partitioning processing unit when the partitioning results are no longer overstocked in the second memory. Specifically, it may be considered that the partitioning results are no longer overstocked in the second memory after the partitioning processing unit has been suspended for first preset duration, or after the usage of the second memory is reduced to below a preset threshold, or under another specified condition. Similarly, if usage of the third memory reaches second preset usage, it indicates that the classification results of the classification processing unit are overstocked in the third memory, and the scheduling processing unit may suspend the classification processing unit. The scheduling processing unit may further restart the classification processing unit when the classification results are no longer overstocked in the third memory. Similarly, if usage of a fourth memory in FIG. 7 reaches third preset usage, the scheduling processing unit may suspend the partitioning processing unit. If usage of a fifth memory in FIG. 7 reaches fourth preset usage, the scheduling processing unit may suspend the classification processing unit. The first preset usage to the fourth preset usage are preset values such as 80% or 90%, or 100% (that is, the memory is full). Values of any two or more of the first preset usage to the fourth preset usage may be the same, or values of the first preset usage to the fourth preset usage may be different from each other, which is not limited herein.

For another example, if remaining space of the second memory is less than a second preset size, it indicates that the partitioning results of the partitioning processing unit are overstocked in the second memory. Consequently, the remaining space of the second memory is insufficient, and the scheduling processing unit may suspend the partitioning processing unit. The scheduling processing unit may restart the partitioning processing unit when the partitioning results are no longer overstocked in the second memory. Specifically, it may be considered that the partitioning results are no longer overstocked in the second memory after the partitioning processing unit has been suspended for first preset duration, or after usage of the second memory is reduced to below a preset threshold, or after the remaining space of the second memory is greater than the preset size, or under another specified condition. Similarly, if remaining space of the third memory is less than a third preset size, it indicates that the classification results of the classification processing unit are overstocked in the third memory, and the scheduling processing unit may suspend the classification processing unit. The scheduling processing unit may further restart the classification processing unit when the classification results are no longer overstocked in the third memory. Similarly, if remaining space of a fourth memory in FIG. 7 is less than a fourth preset size, the scheduling processing unit may suspend the partitioning processing unit. If remaining space of a fifth memory in FIG. 7 is less than a fifth preset size, the scheduling processing unit may suspend the classification processing unit. The second preset size to the fifth preset size are preset values, and may be positive values, or may be 0 (that is, the memory is full). Values of any two or more of the first preset size to the fifth preset size may be the same, or values of the first preset size to the fifth preset size may be different from each other, which is not limited herein.

For another example, the scheduling processing unit may further control start times of an image obtaining operation, a partitioning operation performed by the partitioning processing unit, and a classification operation performed by the classification processing unit.

Specifically, in FIG. 6, an image processing procedure in the pipelining manner is described by using the first image and the second image as an example, and the following describes the image processing procedure in the pipelining manner by using the first image, the second image and a third image as an example.

Figure 8A:
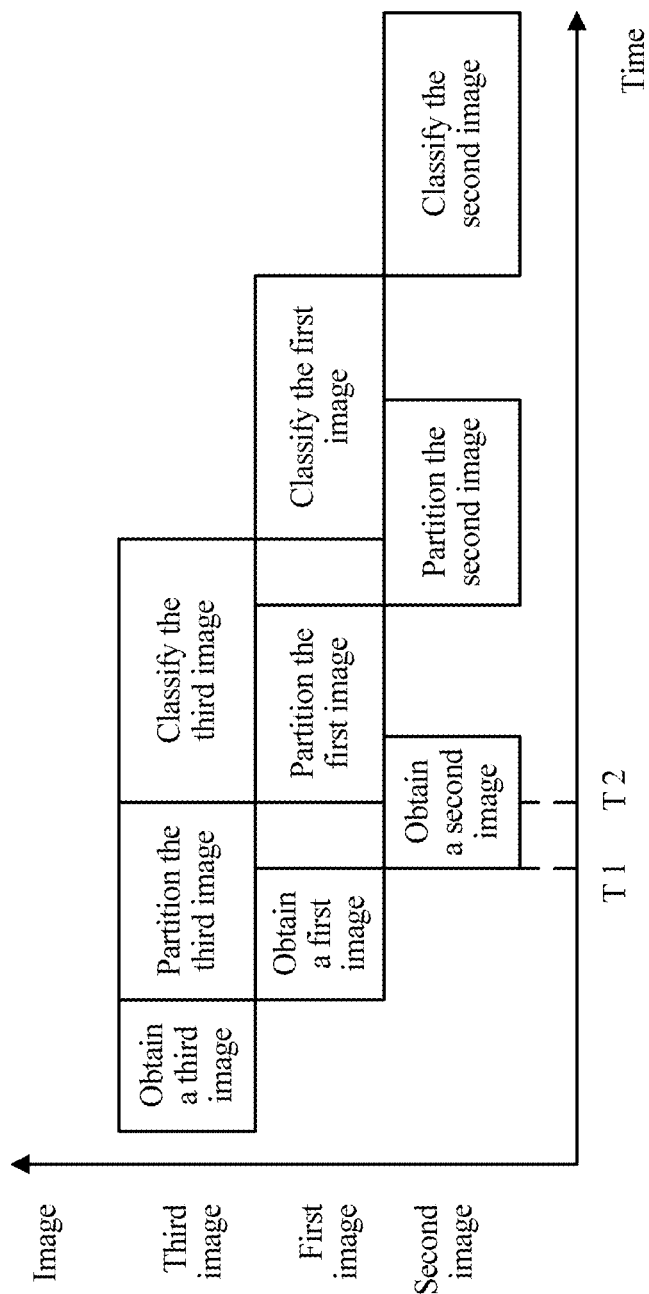
FIG. 8A is another schematic flowchart of an image processing method according to an embodiment of the present application.

Referring now to FIG. 8A, an image processing apparatus successively processes the third image, the first image, and the second image. After obtaining the third image, a scheduling processing unit immediately starts an operation of obtaining the first image, and immediately starts, after completing the operation of obtaining the first image, an operation of obtaining the second image. In the entire image processing procedure, the scheduling processing unit is in an image obtaining operation state all the time. However, at a moment T1 (a moment at which the scheduling processing unit starts the operation of obtaining the second image), the partitioning processing unit is still partitioning the third image, and has not started to partition the first image, or started to partition the second image. Therefore, at the moment T1, the scheduling processing unit only needs to obtain the first image, so that the partitioning processing unit can start to partition the first image at any moment. The second image does not need to be prepared at this moment. The scheduling processing unit needs to obtain the second image only at a moment T2 (a moment at which the partitioning processing unit starts to partition the first image), so that the partitioning processing unit starts, at any moment after completing the operation of partitioning the first image, to partition the second image.

In a time period from T1 to T2, the scheduling processing unit may temporarily stop obtaining the second image, so that the scheduling processing unit gets a rest, so as to reduce average power of the scheduling processing unit. Therefore, in this embodiment of the present application, the scheduling processing unit may control a moment at which the scheduling processing unit starts an operation of obtaining the second to-be-processed image to be no earlier than a moment at which the partitioning processing unit starts the operation of partitioning the first image.

Figure 8B:
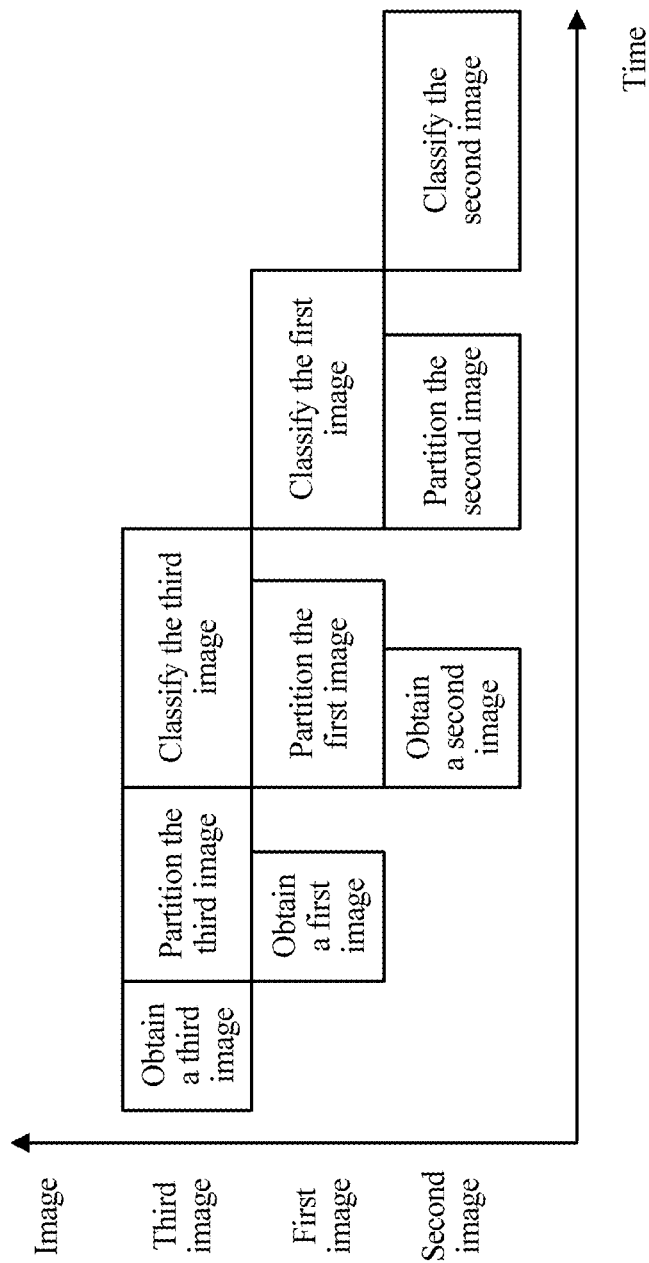
FIG. 8B is another schematic flowchart of an image processing method according to an embodiment of the present application.

Similarly, as shown in FIG. 8B, the scheduling processing unit may further control a moment at which the partitioning processing unit starts an operation of partitioning the second image to be no earlier than a moment at which the classification processing unit starts an operation of classifying the first image.

In the present application, there are many algorithms used by the partitioning processing unit to perform image partitioning, such as Edge Box and BING A specific algorithm is not limited in the present application. The classification processing unit may classify an image by using a convolutional neural network (CNN) or other algorithms, which is not limited in the present application. Optionally, the image processing apparatus provided in the present application may further include a sixth memory, which is configured to store an algorithm and a parameter that are used by the partitioning processing unit to perform the partitioning operation, and an algorithm and a parameter that are used by the classification processing unit to perform the classification operation. The sixth memory is shared by the partitioning processing unit and the classification processing unit.

In the present application, the first memory to the sixth memory that are of the image processing apparatus are described, and processing units that need to and can share these memories are limited. It should be noted that, in addition to being shared by limited processing units, these memories may also be shared by processing units that are not limited. For example, in the present application, the second memory is limited to be shared by the partitioning processing unit and the classification processing unit, but at the same time, the second memory may also be shared by the scheduling processing unit. In the present application, the third memory is limited to be shared by the classification processing unit and the scheduling processing unit, but at the same time, the third memory may also be shared by the partitioning processing unit. Similarly, the fourth memory, the fifth memory, and the sixth memory may also be shared by one, two, or more of the partitioning processing unit, the classification processing unit, and the scheduling processing unit.

Division of the first memory to the sixth memory described in the present application is logical division. Although the first memory to the sixth memory are shown in a separate and independent manner in accompanying drawings, in actual forms of the first memory to the sixth memory, any two or more memories may be integrated. For example, the entire image processing apparatus may include only one memory that is shared by the processing units. The scheduling processing unit divides an address segment of the shared memory into six parts that respectively play roles of the first memory to the sixth memory.

In addition to the first memory to the sixth memory described in the present application, the image processing apparatus provided in the present application may further include more memories. The more memories may be shared by multiple processing units, or may be dedicated to a specific processing unit, which is not limited herein.

For better understanding of the foregoing embodiments, in the following, a specific application scenario of the foregoing embodiments is used as an example for description.

Figure 9:
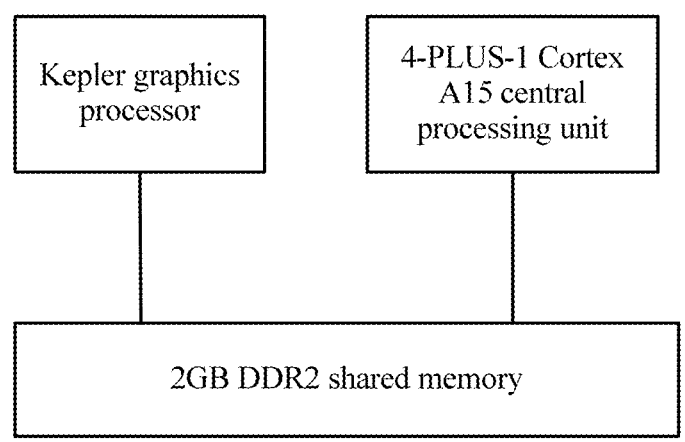
FIG. 9 is a block diagram of an image processing apparatus in an application scenario of the present application.

FIG. 9 shows an example of an image processing apparatus including a CPU+GPU heterogeneous system. The CPU is a 4-PLUS-1 Cortex A15 model and includes four ARM A15 computation cores and one ARM A15 management core with low power consumption. The GPU is a Kepler GPU model and includes 192 GPU CUDA cores. In the heterogeneous system, three ARM A15 computation cores are used for image partitioning (that is, functioning as a partitioning processing unit), one ARM A15 computation core is used for task scheduling (that is, functioning as a scheduling processing unit), and 192 GPU cores are used for image classification (that is, functioning as a classification processing unit). The core of the CPU and the core of the GPU exchange data by using a 2-GB double data rate 2 (DDR2) shared memory, and form a hardware pipeline. An EdgeBox algorithm is used as an image partitioning algorithm, and a CNN is used as an image processing algorithm.

Space of 500 MB is divided by the scheduling processing unit from the 2-GB DDR2 to be used as a first memory, to be configured to store a source image obtained by the scheduling processing unit. Space of 200 MB is divided by the scheduling processing unit from the 2-GB DDR2, to be used as a second memory, to be configured to store a partitioning result of the partitioning processing unit. Space of 100 MB is further divided by the scheduling processing unit from the 2 GB DDR2, to be used as a third memory, to be configured to store a classification result of the classification processing unit.

Figure 10:
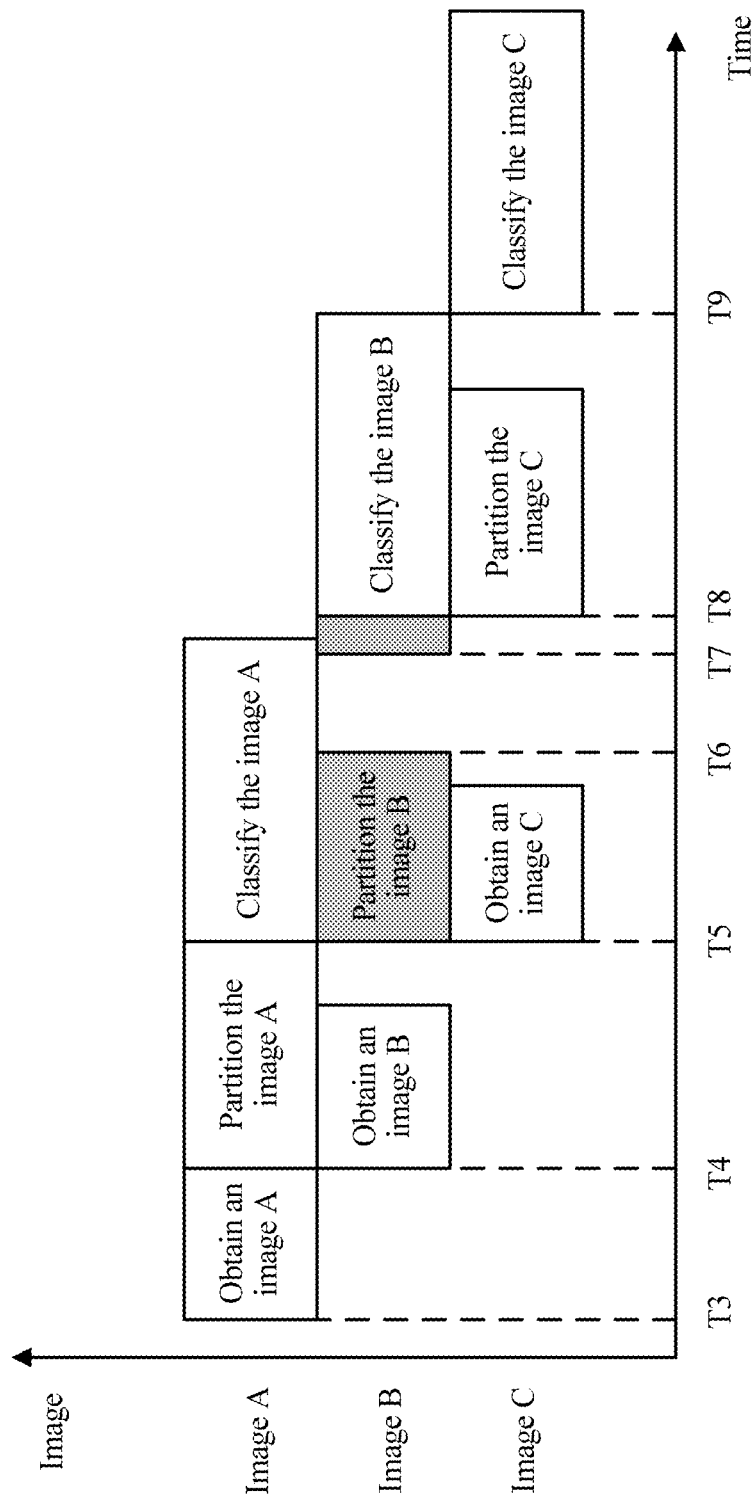
FIG. 10 is a schematic flowchart of an image processing method in an application scenario of the present application.

A user detects and recognizes targets in an image A, an image B, and an image C by using the heterogeneous system shown in FIG. 9. For a specific procedure, refer to FIG. 10. At a moment T3, the scheduling processing unit in the heterogeneous system first obtains the image A and writes the image A in the first memory. At a moment T4, the partitioning processing unit starts an operation of partitioning the image A, which is specifically: reading the image A from the first memory, partitioning the image A, and writing a partitioning result of the image A to the second memory. At the same time, the scheduling processing unit starts an operation of obtaining the image B and writes the image B to the first memory. At a moment T5, the classification processing unit starts an operation of classifying the image A. classifying the image A includes: reading the image A from the first memory, reading the partitioning result of the image A from the second memory, classifying the image A according to the partitioning result of the image A, and writing a classification result to the third memory. At the same time, the partitioning processing unit starts an operation of partitioning the image B: reading the image B from the first memory, partitioning the image B, and writing a partitioning result of the image B to the second memory. At the same time, the scheduling processing unit starts an operation of obtaining the image C and writes the image C to the first memory.

In a time period from T5 to T6, the classification processing unit has not completed the operation of classifying the image A, and therefore cannot process all partitioning results of the image A that are in the second memory. However, in the time period from T5 to T6, the partitioning processing unit is still partitioning the image B, and outputs the partitioning result of the image B to the second memory. Consequently, the partitioning results of the image A and the image B are overstocked in the second memory. It is assumed that the scheduling processing unit suspends the partitioning processing unit if usage of the second memory reaches 100% at the moment T6.

At a moment T7, if remaining space of the second memory is greater than 50 MB, the scheduling processing unit restarts the partitioning processing unit. The partitioning processing unit completes the operation of partitioning the image B, and saves the partitioning result in the second memory. At a moment T8, the classification processing unit starts to classify the image B, and writes a classification result to the third memory. At the same time, the partitioning processing unit starts an operation of partitioning the image C, and writes a partitioning result of the image C to the second memory. At a moment T9, the classification processing unit starts an operation of classifying the image C, and writes a classification result to the third memory.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium, and the storage medium includes: any medium that can store program code, such as a USB flash drive, a removable hard disk, a memory (which may include a read-only memory (ROM), a random access memory (RAM), and the like), a magnetic disk, or an optical disc. The scheduling processing unit, the partitioning processing unit, and the classification processing unit in the present application may all read an instruction in the storage medium, and perform all or a part of steps of each embodiment of the present application according to the read instruction.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An image processing method for use by an image processing apparatus, wherein the image processing apparatus comprises a partitioning unit, a classification unit, a scheduling unit, a first memory, and a second memory, the first memory is shared among the scheduling unit, the partitioning unit and the classification unit, and the second memory is shared between the partitioning unit and the classification unit;
wherein the method comprises:
obtaining, by the scheduling unit, a first image;
saving, by the scheduling unit, the first image in the first memory;
obtaining, by the partitioning unit, the first image from the first memory;
partitioning, by the partitioning unit, the first image into one or more areas, and saving information of the partitioning of the first image in the second memory, wherein each area comprises one or more objects to be classified; and
obtaining, by the classification unit, the first image from the first memory and the information of partitioning of the first image from the second memory;
classifying, by the classification unit, the objects in each area of the first image to obtain a classification result of the first image; and
temporarily suspending, by the scheduling unit, operation of the partitioning unit when usage of the second memory reaches a first usage limit.

2. The method according to claim 1, further comprising:
after saving the first image in the first memory, obtaining, by the scheduling unit, a second image; and
saving, by the scheduling unit, the second image in the first memory.

3. The method according to claim 2, further comprising:
after partitioning the first image and saving the information of the partitioning of the first image in the second memory, obtaining, by the partitioning unit, the second image from the first memory, partitioning the second image into one or more areas, and saving information of the partitioning of the second image in the second memory.

4. The method according to claim 3, wherein a moment at which the scheduling unit starts obtain the second image is no earlier than a moment at which the partitioning unit starts to partition the first image.

5. The method according to claim 3, further comprising:
after classifying the objects in each area of the first image to obtain a classification result of the first image, obtaining, by the classification unit, the second image from the first memory and the information of partitioning of the second image from the second memory, and classifying the objects in each area of the second image to obtain a classification result of the second image.

6. The method according to claim 5, wherein a moment at which the partitioning unit starts to partition the second image is no earlier than a moment at which the classification unit starts to classify the first image.

7. The method according to claim 1, wherein the image processing apparatus further comprises a third memory, and the third memory is shared between the scheduling unit and the classification unit; wherein the method further comprises:
saving, by the classification unit, the classification result of the first image in the third memory; and
obtaining, by the scheduling unit, the classification result of the first image from the third memory, and outputting the classification result of the first image from the image processing apparatus.

8. The method according to claim 7, further comprising:
temporarily suspending, by the scheduling unit, operation of the classification unit when usage of the third memory reaches a second usage limit.

9. The method according to claim 7, further comprising:
  obtaining, by the scheduling unit, a first duration in which the partitioning processing unit partitions the first image and a second duration in which the classification unit classifies the first image;
  when the first duration is greater than the second duration, reducing, by the scheduling unit, a size of the third memory, or a bandwidth of the third memory, or both; and
  when the first duration is less than the second duration, increasing, by the scheduling unit, the size of the third memory, the bandwidth of the third memory, or both.

10. The method according to claim 1, further comprising:
  obtaining, by the scheduling unit, a first duration in which the partitioning unit partitions the first image and a second duration in which the classification unit classifies the first image;
  when the first duration is greater than the second duration, increasing, by the scheduling unit, a size of the second memory, or a bandwidth of the second memory, or both; and
  when the first duration is less than the second duration, decreasing, by the scheduling unit, the size of the second memory, or the bandwidth of the second memory, or both.

11. The method according to claim 1, wherein the image processing apparatus further comprises a fourth memory, configured to store an intermediate result generated when the partitioning unit partitions the first image; wherein the method further comprises:
  obtaining, by the scheduling unit, a first duration in which the partitioning unit partitions the first image and a second duration in which the classification unit classifies the first image;
  when the first duration is greater than the second duration, increasing, by the scheduling unit, a size of the fourth memory, or a bandwidth of the fourth memory, or both; and
  when the first duration is less than the second duration, reducing, by the scheduling unit, the size of the fourth memory, or the bandwidth of the fourth memory, or both.

12. The method according to claim 1, wherein the image processing apparatus further comprises a fifth memory, configured to store an intermediate result generated when the classification unit classifies the first image; wherein the method further comprises:
  obtaining, by the scheduling unit, a first duration in which the partitioning unit partitions the first image and a second duration in which the classification unit classifies the first image;
  when the first duration is greater than the second duration, reducing, by the scheduling unit, a size of the fifth memory, or a bandwidth of the fifth memory, or both; and
  when the first duration is less than the second duration, increasing, by the scheduling unit, the size of the fifth memory, or the bandwidth of the fifth memory, or both.

13. An image processing device, comprising:
  one or more processors forming a partitioning unit,
  one or more processors forming a classification unit,
  one or more processors forming a scheduling unit,
  a first memory, and
  a second memory;
  wherein the partitioning unit and the classification unit are heterogeneous processing units;
  wherein the first memory is shared among the scheduling unit, the partitioning unit and the classification unit, and the second memory are shared between the partitioning unit and the classification unit;
  wherein the scheduling unit is configured to:
    obtain a first image; and
    save the first image in the first memory;
  wherein the partitioning unit is configured to:
    obtain the first image from the first memory;
    partition the first image into one or more areas, wherein each area comprises one or more objects to be classified; and
    save information of the partitioning of the first image in the second memory;
  wherein the classification unit is configured to:
    obtain the first image from the first memory;
    obtain information of partitioning of the first image from the second memory; and
    classify the objects in each area of the first image to obtain a classification result of the first image;
  and the scheduling unit is further configured to:
    temporarily suspend operation of the partitioning unit when usage of the second memory reaches a first usage limit.

14. The image processing device according to claim 13, wherein the scheduling unit is further configured to:
  after saving the first image in the first memory, obtain a second image; and
  save the second image in the first memory.

15. The image processing device according to claim 14, wherein the partitioning unit is further configured to:
  after partitioning the first image and saving the information of the partitioning of the first image in the second memory, obtain the second image from the first memory, partition the second image into one or more areas, and save information of the partitioning of the second image in the second memory.

16. The image processing device according to claim 15, wherein a moment at which the scheduling unit starts obtain the second image is no earlier than a moment at which the partitioning unit starts to partition the first image.

17. The image processing device according to claim 15, wherein the classification unit is further configured to:
  after classifying the objects in each area of the first image to obtain a classification result of the first image, obtain the second image from the first memory and the information of partitioning of the second image from the second memory, and classify the objects in each area of the second image to obtain a classification result of the second image.

18. The image processing device according to claim 17, wherein a moment at which the partitioning unit starts to partition the second image is no earlier than a moment at which the classification unit starts to classify the first image.

19. The image processing device according to claim 13, further comprising:
  a third memory, wherein the third memory is shared between the scheduling unit and the classification unit;
  wherein the classification unit is further configured to:
    save the classification result of the first image in the third memory;
  wherein the scheduling unit is further configured to:
    obtain the classification result of the first image from the third memory; and
    output the classification result of the first image.

20. The image processing device according to claim 19, wherein the scheduling unit is further configured to:

temporarily suspend operation of the classification unit when usage of the third memory reaches a second usage limit.

21. The image processing device according to claim 19, wherein the scheduling unit is further configured to:
   obtain a first duration in which the partitioning processing unit partitions the first image and a second duration in which the classification unit classifies the first image;
   when the first duration is greater than the second duration, reduce a size of the third memory, or a bandwidth of the third memory, or both; and
   when the first duration is less than the second duration, increase the size of the third memory, the bandwidth of the third memory, or both.

22. The image processing device according to claim 13, wherein the scheduling unit is further configured to:
   obtain a first duration in which the partitioning unit partitions the first image and a second duration in which the classification unit classifies the first image;
   when the first duration is greater than the second duration, increase a size of the second memory, or a bandwidth of the second memory, or both; and
   when the first duration is less than the second duration, decrease the size of the second memory, or the bandwidth of the second memory, or both.

23. The image processing device according to claim 13, further comprising a fourth memory, configured to store an intermediate result generated when the partitioning unit partitions the first image;
   wherein the scheduling unit is further configured to:
      obtain a first duration in which the partitioning unit partitions the first image and a second duration in which the classification unit classifies the first image;
      when the first duration is greater than the second duration, increase a size of the fourth memory, or a bandwidth of the fourth memory, or both; and
      when the first duration is less than the second duration, reduce the size of the fourth memory, or the bandwidth of the fourth memory, or both.

24. The image processing device according to claim 13, further comprising a fifth memory configured to store an intermediate result generated when the classification unit classifies the first image;
   wherein the scheduling unit is further configured to:
      obtain a first duration in which the partitioning unit partitions the first image and a second duration in which the classification unit classifies the first image;
      when the first duration is greater than the second duration, reduce a size of the fifth memory, or a bandwidth of the fifth memory, or both; and
      when the first duration is less than the second duration, increase the size of the fifth memory, or the bandwidth of the fifth memory, or both.

* * * * *

UNITED STATES PATENT AND TRADEMARK OFFICE
CERTIFICATE OF CORRECTION

PATENT NO. : 10,740,657 B2
APPLICATION NO. : 15/964045
DATED : August 11, 2020
INVENTOR(S) : Yao et al.

It is certified that error appears in the above-identified patent and that said Letters Patent is hereby corrected as shown below:

In the Specification

In Column 14, Line 66, delete "BING" and insert -- BING. --, therefor.

Signed and Sealed this
Twenty-eighth Day of November, 2023

Katherine Kelly Vidal
*Director of the United States Patent and Trademark Office*